United States Patent Office 3,190,908
Patented June 22, 1965

3,190,908
5-METHOXY-2-PENTENE 1-(O,O-DIETHYL PHOSPHORODITHIOATE) AND 1-IODO DERIVATIVES
William J. Pyne, Painesville, Ohio, assignor to Diamond Alkali Company, Cleveland, Ohio, a corporation of Delaware
No Drawing. Filed May 31, 1961, Ser. No. 128,612
2 Claims. (Cl. 260—461)

This invention relates to new compositions of matter and, in particular, to compounds represented by the formula:

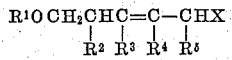

wherein X is selected from the group consisting of halogen of atomic weight greater than 37,

and

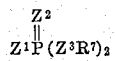

$R^1$ is selected from the group consisting of aryl, aralkyl and $C_mH_{2m+1}$; $R^2$, $R^3$, $R^4$ and $R^5$ are selected from the group consisting of hydrogen, alkyl, aryl and aralkyl; $R^6$ is selected from the group consisting of hydrogen, aryl, aralkyl and $C_nH_{2n+1}$; $R^7$ is selected from the group consisting of alkyl, aryl and aralkyl; $Z^1$, $Z^2$ and $Z^3$ are selected from the group consisting of O, S and NH; $m$ and $n$ are integers from 1 to 20 and $n \neq 1$ when $m$ is greater than 1.

Examples of novel compounds of this invention are the following:

1-iodo-5-methoxy-2-pentene:

$$CH_3OCH_2CH_2CH=CHCH_2I$$

S-(5-methoxy-2-pentenyl) O,O-diethyl phosphorodithioate:

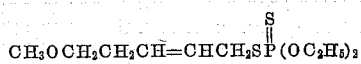

5-methoxy-2-pentenyl acetate:

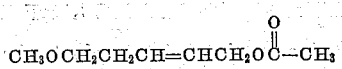

Compounds of the present invention may be prepared by reacting a compound of the formula

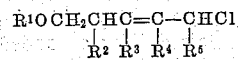

where $R^1$, $R^2$, $R^3$, $R^4$ and $R^5$ are as defined hereinabove with a salt of the formula MX, where X is as defined hereinabove and M is alkali metal or ammonium. The reactants are normally used in approximately equimolar proportions. The reaction is ordinarily carried out in a suitable solvent, such as ethanol or other alkanols, ethers (e.g., ethyl ether, tetrahydrofuran, dioxane), acids (e.g., acetic acid), ketones (e.g., acetone, methyl ethyl ketone, cyclohexanone), aliphatic or aromatic hydrocarbons and substituted derivatives thereof, and the like. It is preferable to add the chloride slowly to the solution of the other reactant; however, the inverse method of addition may be used or the materials may be pre-mixed, if desired. The reaction may be carried out at temperatures from about 25° to 150° C., and preferably from about 45° to 130° C. The reflux temperature of the solvent employed is often a suitable temperature. The time required for reaction is normally between 15 minutes and 10 hours. The products may be purified, if desired, by distillation at atmospheric or reduced pressures, or in the case of solids by recrystallization from an appropriate solvent.

The compounds of this invention are useful as chemical intermediates and are also effective as pesticides for controlling insects, fungi, bacteria and other organisms in the class of plant pests.

While it is possible to apply the compounds of the present invention in undiluted form to the plant or other material to be protected, it is frequently desirable to apply the novel compounds in admixture with either solid or liquid inert, pesticidal adjuvants. Thus, they can be applied to the plants for fungicidal purposes, for example, by spraying them with aqueous or organic solvent dispersions of the compound. Similarly, wood surfaces can be protected by applying a protective film of the compound by brushing, spraying or dipping utilizing a liquid dispersion of the compound. The choice of an appropriate solvent is determined largely by the concentration of active ingredient which it is desired to employ, by the volatility required in a solvent, the cost of the solvent and the nature of the material being treated. Among the many suitable organic solvents which can be employed as carriers for the present pesticides, there may be mentioned hydrocarbons such as benzene, toluene, xylene, kerosene, diesel oil, fuel oil, petroleum, naphtha, ketones such as acetone, methyl ethyl ketone and cyclohexanone, chlorinated hydrocarbons, such as carbon tetrachloride, chloroform, trichloroethylene, perchloroethylene, esters such as ethyl acetate, amyl acetate and butyl acetate, the monoalkyl ethers of ethylene glycol, e.g., the monomethyl ethers and the monoalkyl ethers of diethylene glycol, e.g., the monoethyl ether, alcohols such as ethanol, isopropanol and amyl alcohol, etc.

The compounds can also be applied to plants and other materials along with inert solid fungicidal adjuvants or carriers such as talc, pyrophyllite, Attaclay, kieselguhr, chalk, diatomaceous earth, lime, calcium carbonate, bentonite, fuller's earth, cottonseed hulls, wheat flour, soybean flour, etc., pumice, tripoli, wood fluor, walnut shell flour and lignin.

It is frequently desirable to incorporate a surface active agent in the pesticidal compositions of this invention. Such surface active agents are advantageously employed in both the solid and liquid compositions. The surface active agent can be anionic, cationic or nonionic in character.

Typical classes of surface active agents include alkyl sulfonates, alkylaryl sulfonates, alkyl sulfates, alkylamide sulfonates, alkylaryl polyether alcohols, fatty acid esters of polyhydric alcohols, ethylene oxide addition products of such esters; addition products of long chain mercaptans and ethylene oxide; sodium alkyl benzene sulfonates having 14 to 18 carbon atoms, alkylphenolethylene oxides, e.g., p-isooctyl phenol condensed with 10 ethylene oxide units; and soaps, e.g., sodium stearate and sodium oleate.

The solid and liquid formulations can be prepared in any suitable method. Thus, the active ingredients, in finely divided form if a solid, may be tumbled together with finely divided solid carrier. Alternatively, the active ingredient in liquid form, including solutions, dispersions, emulsions and suspensions thereof, may be admixed with the solid carrier in finely divided form in amounts small enough to preserve the free-flowing property of the final dust composition.

When solid compositions are employed, in order to obtain a high degree of coverage with a minimum dosage of the formulation, it is desirable that the formulation be in finely divided form. The dust containing active ingredient usually should be sufficiently fine that substantially all will pass through a 20 mesh Tyler sieve. A dust which passes through a 200 mesh Tyler sieve also is satisfactory.

For dusting purposes, preferably formulations are employed in which the active ingredient is present in an amount of 5 to 50% of the total by weight. However, concentrations outside this range are operative and compositions containing from 1 to 99% of active ingredient by weight, the remainder being carrier and/or any other additive or adjuvant material which may be desired. It is often advantageous to add small percentages of surface active agents, e.g., 0.5 to 1% of the total composition by weight, to dust formulations, such as the surface active agents previously set forth.

For spray application, the active ingredient may be dissolved or dispersed in a liquid carrier, such as water or other suitable liquid. The active ingredient can be in the form of a solution, suspension, dispersion or emulsion in aqueous or non-aqueous medium. Desirably, 0.5 to 1.0% of a surface active agent by weight is included in the liquid composition.

For adjuvant purposes, any desired quantity of surface active agent may be employed, such as up to 250% of the active ingredient by weight. If the surface active agent is used only to impart wetting qualities, for example, to the spray solution, as little as 0.05% by weight or less of the spray solution need be employed. The use of larger amounts of surface active agent is not based upon wetting properties but is a function of the physiological behavior of the surface active agent. These considerations are particularly applicable in the case of the treatment of plants. In liquid formulations the active ingredient often constitutes not over 30% by weight of the total and may be 10%, or even as low as 0.01%.

The novel compounds of the present invention can be employed in compositions containing other pesticides, more especially fungicides, insecticides, herbicides, nematocides and bactericides, e.g., phenothiazine, pyrethrum, rotenone, 2,4-D, DDT, etc.

In order that those skilled in the art may more completely understand the present invention and the preferred methods by which the same may be carried into effect, the following specific examples may be offered.

EXAMPLE 1.—1-CHLORO-5-METHOXY-2-PENTENE

Butadiene, 324 g. (6 moles) is bubbled into a mixture of 482.5 g. (5 moles) of monochloromethyl ether and 20 g. of zinc chloride. The temperature of the mixture is maintained below 15° C. The solution is washed with aqueous sodium carbonate solution and water; the organic layer is extracted with benzene and the benzene extract is dried over magnesium sulfate. The benzene is removed by distillation and the residue is distilled under reduced pressure. There is obtained 182 g. (27% of the theoretical amount) of 1-chloro-5-methoxy-2-pentene, $C_6H_{11}ClO$, B.P. 56° to 57° C. at a pressure of 10 mm. of mercury. The structure is confirmed by comparison of the experimentally determined index of refraction (1.4540 at 20° C.) with that reported by L. H. Amundsen et al. in "Journal of the American Chemical Society," vol. 73, page 1834 (1.4540 at 20° C.).

EXAMPLE 2.—1-IODO-5-METHOXY-2-PENTENE

To a solution of 25 g. (0.166 mole) of sodium iodide in 80 ml. of acetone is slowly added 23 g. (0.17 mole) of 1-chloro-5-methoxy-2-pentene. The mixture is boiled gently for about 30 minutes, cooled and filtered. The solid residue is washed with acetone and the combined filtrate and acetone washings are concentrated to remove the solvent. After removal of the acetone, there remains 30 g. (78% of the theoretical amount) of 1-iodo-5-methoxy-2-pentene, $C_6H_{11}IO$. The following analytical results confirm the proposed structure.

| Element | Actual, percent by weight | Calculated, percent by weight |
| --- | --- | --- |
| C | 32.37 | 31.90 |
| H | 5.18 | 4.87 |

EXAMPLE 3.—S-(5-METHOXY-2-PENTENYL)-O,O-DIETHYL PHOSPHORODITHIOATE

To a solution of 43 g. (0.21 mole) of ammonium O,O-diethyl phosphorodithioate in 75 ml. of ethanol is added, dropwise, 34 g. (0.25 mole) of 1-chloro-5-methoxy-2-pentene. The solution is heated under reflux for 2 hours and then poured into water. The organic layer is separated and the aqueous layer is extracted with chloroform. The chloroform extracts are washed with water and combined with the organic layer, which is then dried over magnesium sulfate. After filtration to remove the drying agent, the chloroform is recovered by evaporation under reduced pressure. There remains 51.5 g. (72% of the theoretical amount) of S-(5-methoxy-2-pentenyl) O,O-diethyl phosphorodithioate, $C_{10}H_{21}O_3PS_2$, which is supported by the following analytical results.

| Element | Actual, percent by weight | Calculated, percent by weight |
| --- | --- | --- |
| C | 42.29 | 42.24 |
| H | 7.44 | 7.40 |

EXAMPLE 4.—5-METHOXY-2-PENTENYL ACETATE

To a solution of 82 g. (1 mole) of sodium acetate in 250 ml. of acetic acid is added, dropwise, 134 g. (1 mole) of 1-chloro-5-methoxy-2-pentene. The solution is heated at 120° to 125° C. for 8 hours and is then poured into water. The organic layer is separated and the aqueous layer is extracted with chloroform. The combined chloroform extracts and organic layer are dried over magnesium sulfate and the chloroform is removed by evaporation. Upon distillation of the residue, 115.6 g. (73% of the theoretical amount) of 5-methoxy-2-pentenyl acetate, $C_8H_{14}O_3$, is obtained boiling at 51° to 53° C. at a pressure of 1.8 mm. of mercury. The following analytical data support the proposed structure.

| Element | Actual, percent by weight | Calculated, percent by weight |
| --- | --- | --- |
| C | 60.64 | 60.74 |
| H | 8.49 | 8.92 |

EXAMPLE 5.—BEAN BEETLE LEAF DIP TEST

The following test is used to evaluate the insecticidal properties of the test chemical against the Mexican bean beetle.

Fourth instar larvae of the bean beetle (*Epilachna varivestis*), less than one day old within the instar, is the test species. Paired fully expanded seed leaves excised from Tendergreen bean plants are dipped in the test formulation (512 p.p.m. of the test compound, 4% acetone, 0.01% Triton X-155, balance water) and agitated until they are thoroughly wetted. The chemical deposited on the leaves is then dried and the paired leaves are separated. The drying is accomplished by placing the excised stem in water to prevent wilting and holding in a hood with the fan operating. One leaf is placed into each of two Dixie cups (5 oz.) and 10 randomly selected larvae are counted into each Dixie cup which is then covered with a 9 cm. Petri dish cover. These are held at 70° F. for three days when mortality and feeding inhibition are determined. Using this test procedure, S-(5-methoxy-2-pentenyl) O,O-diethyl phosphorodithioate at 512 p.p.m. gave a mortality rate of 85%.

EXAMPLE 6.—BEAN APHID SPRAY TEST

The bean aphid (*Aphis rumicis*) is cultured on nasturtium plants, var. Tall Single. No attempt is made to select insects of a given age in these tests. Between one and two days after transferring aphids to a new flat of nasturtiums, about 2" tall, grown in 2½" clay pots, the plants are trimmed so that each pot contains one to five stems with an approximate total of 100 aphids per pot. Spraying is done in a spray hood equipped with a rotating turntable by means of a De Vilbiss paint spray gun (Type CH) calibrated to deliver 45 ml. of water in 30 seconds at 30 pounds air pressure per square inch. Forty-five ml. of formulation (see Example 5) are sprayed. The pots are placed in an inclined position in Dixie cups (3¼" diameter x 1¼" deep), over paper marked with a grid. Most dead aphids fall to the paper. Percentage mortality is determined one day after spraying. The use of S-(5-methoxy-2-pentenyl) O,O-diethyl phosphorodithioate in this test, at 512 p.p.m., results in a mortality rate of 98%.

EXAMPLE 7.—RED SPIDER MITE SPRAY TEST

The stock culture of mites is maintained on Tendergreen bean foliage. Approximately 18 to 24 hours before testing, mites are transferred from the stock culture by pieces of infested leaves which are placed on the primary leaves of two bean plants grown in 2½" pots. As leaf fragments dry the mites migrate to the uninfested leaves. Immediately before spraying, the leaf fragments are removed from the foliage. The freshly infested plants are then sprayed along with the aphid infested nasturtiums, as described in Example 6. After two days, two of the four leaves treated are examined under a binocular stereoptic microscope and the mortality determined. By this method, S-(5-methoxy-2-pentenyl) O,O-diethyl phosphorodithioate at 512 p.p.m. gave a 55% mortality rate.

EXAMPLE 8.—FOLIAGE PROTECTANT AND ERADICANT TESTS

The tomato foliage disease test measures the ability of the test compound to protect tomato foliage against infection by the early blight fungus *Alternaria solani*. Results from this test indicate whether a compound may have practical use as a foliage protectant fungicide.

The method used employs tomato plants (var. Bonny Best) five to seven inches high which are four to six weeks old. Duplicate plants are sprayed with 100 ml. of the test formulation (2000 p.p.m. of the test chemical, 4% acetone, 0.01% Triton X-155, balance water) at 40 lbs. air pressure while being rotated on a turntable in a hood. The center of the turntable is 45 inches from the nozzle of the spray gun.

After the spray deposit is dry, treated plants and controls (sprayed with formulation less toxicant) are sprayed while being rotated on a turntable with a spore suspension containing approximately 20,000 conidia of *A. solani* per ml. The atomizer used delivers 20 ml. in the 30-second exposure period. The plants are held in a saturated atmosphere for 24 hours at 70° F. to permit spore germination and infection before removal to the greenhouse.

After two days from the start of the test, lesion counts are made on the three uppermost fully expanded leaves. The data are converted to percentage disease control based on the number of lesions obtained on the control plants.

When tested by this method, S-(5-methoxy-2-pentenyl) O,O-diethyl phosphorodithioate gave 34% control and 1-iodo-5-methoxy-2-pentene gave 32% control.

EXAMPLE 9.—BACTERICIDAL TEST

Test chemicals are examined for ability to inhibit the growth of four bacterial species, *Erwinia amylovora*, *Xanthomonas phaseoli*, *Micrococcus pyogenes* var. *aureus* and *Escherichia coli*. The first two and the fourth above named test species are Gram negative rods, the third species is gram positive. They are all cultured on nutrient agar slants except *X. phaseoli* which is grown on potato dextrose agar.

The basic test formulation contains 1250 p.p.m. of the test compound, 5% acetone and 0.0125% Triton X-155 in water; this formulation diluted to give the stated concentration of test chemical for the screening procedure.

The cultures used for tests are sub-cultured for two sequential 24-hour periods to insure uniform test populations. Bacterial suspensions are made from the second sub-culture in the culture tube by addition of distilled water and gentle agitation after which they are filtered through double layers of cheesecloth and adjusted to standard concentrations by turbidimetric measurement. Each of four test tubes arranged in a rack receive one ml. of the test formulation. After the test formulations have been measured into a test tube, 3½ ml. of distilled water and ½ ml. of bacterial suspension for each respective test organism is added to each test tube. The medication tubes are then set aside at room temperature for four hours. After this exposure period transfers are made by means of a standard four mm. platinum loop to 7 ml. of sterile broth into test tubes arranged in racks similar to those for the medication tubes. The broth tubes are then incubated for 48 hours at 29° to 31° C. at which time growth is measured by use of a Bausch & Lomb spectronic "20" direct reading colorimeter. A reading is recorded for each test tube after shaking. Usually three replicates of each organism serve as controls. Calculations are made on percent of the mean check readings. This figure subtracted from 100 gives percent control as compared to checks. The results of these tests are given in the following table.

*Results of bactericidal tests*

| Compound | Concentration, p.p.m. | Percent Control | | | |
|---|---|---|---|---|---|
| | | E. amylovora | X. phaseoli | M. aureus | E. coli |
| 1-iodo-5-methoxy-2-pentene | 32 | 100 | 100 | 100 | 100 |
| S-(5-methoxy-2-pentenyl) O,O-diethyl phosphorodithioate | 500 | 20 | 81 | 22 | 2 |
| 5-methoxy-2-pentenyl acetate | 500 | 30 | 40 | 50 | 0 |

It is to be understood that although the invention has been described with specific reference to particular embodiments thereof, it is not to be so limited, since changes and alterations therein may be made which are within the full intended scope of this invention as defined by the appended claims.

What is claimed is:
1. S-(5-methoxy-2-pentenyl) O,O-diethyl phosphorodithioate.
2. 1-iodo-5-methoxy-2-pentene.

References Cited by the Examiner

UNITED STATES PATENTS

| | | | |
|---|---|---|---|
| 2,075,312 | 3/37 | Straus | 260—614 |
| 2,075,313 | 3/37 | Straus | 260—614 |
| 2,937,201 | 5/60 | Ziegenbein et al. | 260—614 |
| 2,943,975 | 7/60 | Metivier | 260—461.112 |
| 2,952,701 | 9/60 | McConnell et al. | 260—461 |
| 2,957,905 | 10/60 | Gaertner | 260—461 |
| 2,970,940 | 2/61 | Jones et al. | 167—22 |
| 2,983,644 | 5/61 | Willard et al. | 167—22 |
| 3,028,302 | 4/62 | Chupp | 260—461.112 |

OTHER REFERENCES

Pudovik et al.: "Chem. Abst.," vol. 42, column 6312(f), (1948).

CHARLES B. PARKER, *Primary Examiner.*

M. O. WOLK, IRVING MARCUS, *Examiners.*